Patented Oct. 20, 1942

2,299,374

UNITED STATES PATENT OFFICE 2,299,374

METHOD OF MOLDING NONPLASTIC MATERIALS

Fred A. Bickford, Corning, N. Y., assignor to Corning Glass Works, Corning, N. Y., a corporation of New York No Drawing. Application April 9, 1941, Serial No. 387,773

4 Claims. (Cl. 25—156)

This invention relates to the molding of pulverized materials and particularly to the method known as slip casting. The latter method has been employed extensively for the molding of plastic materials such as clays and other argillaceous substances wherein the plasticity provides properties essential for the suitability of a slip and imparts a desirable degree of green strength without addition of binding agents. The slip casting of purely non-plastic materials free from plasticizers and binding agents is attended with serious difficulties. Lack of green strength in the cast article prevents the production of intricate shapes with accurate dimensions. Despite the most careful preparation of the slip, segregation occurs during the casting thereof and the coarser particles settle towards the bottom. Such stratification or varying density of the article causes the formation of cracks on drying or firing. To some extent, segregation is influenced by the grain sizing and material which is too coarse settles rapidly and results in castings which have poor green strength. On the other hand, if the material is too finely pulverized, the slip is slow in setting up due to the fact that the smallest particles clog the pores of the mold thus interfering with the rapid absorption of the water. In the latter case, there is a strong tendency for the formation of voids in the casting.

The primary object of this invention is to produce molded articles from pulverized non-plastic ceramic materials by slip casting.

Another object is to form sintered articles by slip casting non-plastic refractory oxides, silicates and the like, such as alumina, zirconia, silica, glass, zircon, beryl, etc.

Another object is to improve the surface activity and physical characteristics of non-plastic ceramic materials so that suitable slips and castings can be made therefrom without addition of plasticizers and binders.

Another object is to increase the green strength of articles slip cast from purely non-plastic ceramic materials free from plasticizers and binding agents.

Another object is to prevent segregation in slips composed of such materials.

Another object is to fire articles so produced without causing cracks therein.

I have discovered that a slip which is suitable for my purposes can be prepared only by wet milling a non-plastic ceramic material until at least 95% of it will pass through a screen having 325 meshes per inch, drying the resultant slip at 100° C. to 300° C., whereupon it becomes a hard chalky mass, reducing the dry mass to a powder of uniform texture free from lumps and stirring the powder with water sufficient to produce a slip of the desired viscosity. The slip thus prepared may then be cast in the usual manner in a porous mold and the solidified cast article may thereafter and without cracking be dried and fired to sinter or fuse the particles together. I have further found that non-plastic materials which possess certain characteristics require a preliminary calcination before being wet ground, as will later appear.

In practicing the invention the material, if not already broken to a size suitable for ball milling, is crushed and passed through a screen having about twelve meshes to the inch in order to facilitate subsequent operations. The crushed material is then finely pulverized by wet-grinding it, preferably in a ball mill, until at least 95% of it will pass through a screen having 325 meshes per inch. In general, a mixture of about 80% of the material and 20% of water by weight has been found suitable for the wet-grinding. The length of time required will vary, depending upon the size of the ball mill and other factors, but may readily be determined by trial. The extent or duration of such wet-grinding is important, because it has been found that, although the grinding must be sufficiently prolonged to produce the above mentioned particle size, an excessively long continued grinding thereafter produces a slip which sets up too slowly and possesses other undesirable characteristics. The particle size is easily measured by diluting a sample of the slip and testing it with the screen. The proper grinding time for any particular mill having been determined, subsequent batches may be ground under like conditions without resort to the test. Even if the above conditions and requirements be fulfilled, nevertheless, the slip resulting at this stage of the process, if cast in the usual manner, will not produce satisfactory results.

In order to overcome objectionable segregation of the slip before it sets up, increase the speed of setting and make possible the production of homogeneous castings which will not crack on being dried or fired, it is necessary to employ the following steps which I consider of the utmost importance for the objects in view. The slip is first dewatered and thoroughly dried as a result of which the originally finely pulverized material is agglomerated into a hard, coherent, chalky mass. This is best accomplished by pouring the slip into a shallow container, evaporating the water and baking the residue at a temperature of 100°–300° C. The agglomerated mass is then reduced to a powder, preferably in a ball mill until all lumps have disappeared and the texture of the material appears uniform. The time required will depend somewhat upon the size of the mill but should not require more than one to three hours. The powder is mixed with water in the original proportions to form a slip.

For articles having a wall thickness exceeding about one-fourth inch I have found that the steps of drying and repowdering are essential for the successful slip casting of non-plastic ceramic materials without the use of electrolytes, plasticizers and binders. Comparison of the particles of the initially wet ground material with those of the subsequently dried and powdered material reveals that the latter are composed of various sized aggregates having a maximum size somewhat larger than the largest particles of the original slip and showing little if any of the finest of the original particles. These aggregates are composed each of a plurality of minute fragments of the material stuck together. The reason for such coherence in the absence of binders and electrolytes is not understood but it is believed to depend upon a gluing action by the ultra fine particles. The product at this stage is apparently no more plastic than when initially ground. It is further believed that voids exist between the fragments and make the aggregates porous and more buoyant than the solid particles of similar size in the original slip. Whatever the reason the slip formed from the dried and powdered material does not settle and segregate easily despite the presence of the larger aggregates and strong castings can thereby be obtained. Moreover, the paucity of ultra fine particles in the final slip causes less clogging of the pores of the mold and hence promotes more rapid setting of the casting. Setting rates for articles of comparable size and thickness are thereby increased by as much as 200%. Castings thus produced have a remarkable high green strength, particularly when slightly damp.

Since it is desirable in casting the slip to get it into the mold without substantial settling of the particles, it is further advantageous to stir the slip before it is cast. It has been found that prolonged stirring increases the mobility of the slip and it is therefore preferable to stir it for one or two hours prior to casting. However, excessive stirring is to be avoided because of a tendency for the aggregates finally to disintegrate which thereby increases the set-up time.

Non-plastic materials which are produced by fusion, such as alumina, glass and the like, and also those materials which, during the course of their manufacture and refinement, are ultimately calcined, such as burned clays, zircon, etc., are particularly suitable for molding by the above described process. However, some non-plastic materials which are derived directly from natural sources and also those materials which are manufactured by precipitation or chemical refining processes and which are not ultimately calcined, tend to thicken or gel during the wet milling step of the above described process and hence do not produce satisfactory results. Such materials comprise hydrated alumina, zirconia, refined zircon, beryl and other siliceous minerals.

I have found that the characteristics of the latter materials can be improved so that they are suitable for use in the above process by calcining them before they are wet milled.

For making hollow articles the slip may be cast into a porous mold provided with a porous core or it may be molded by the process known as drain casting. In the latter process, the slip is poured into a porous mold having the desired configuration and, after a suitable interval to permit setting of the material adjacent the walls, the liquid interior portion is poured out. Slips prepared in the above described manner set rapidly and drain-cast articles produced thereby possess a dense uniform structure which in the green state can be handled without breakage.

Upon removal from the mold the article is permitted to dry slowly in the air and, after a preliminary heating at low temperatures to expel all moisture, is fired at a temperature and for a time sufficient to cause sintering or incipient fusion of the particles.

I claim:

1. The method of slip casting non-plastic ceramic materials which includes wet milling the material until at least 95% of it will pass through a screen having 325 meshes per inch, drying the resultant slip to a coherent chalky mass, repowdering the mass to a uniform texture free from lumps, forming a slip of the dried and repowdered material with water, introducing the slip into a mold and extracting the water from the slip.

2. The method of slip casting non-plastic ceramic materials, which includes wet milling the material with about 20% by weight of water until at least 95% of the particles thereof will pass through a screen having 325 meshes per inch, evaporating the water and drying the material at 100° C. to 300° C. to a coherent chalky mass, powdering the dried mass until the individual particles thereof have approximately the same size as the maximum size of the wet milled particles, forming a slip of the dried and repowdered material with water and casting the slip into a porous mold.

3. The method of slip casting non-plastic ceramic materials, which includes calcining the material, wet milling the material until at least 95% of it will pass through a screen having 325 meshes per inch, drying the resultant slip to a coherent chalky mass, powdering the mass to a uniform texture free from lumps, forming a slip of the powder with water, introducing the slip into a mold and extracting the water from the slip.

4. The method of slip casting non-plastic ceramic materials, which includes calcining the material, wet milling the material with about 20% by weight of water until at least 95% of the particles of material will pass through a screen having 325 meshes per inch, evaporating the water and drying the material at 100° C. to 300° C. to a coherent chalky mass, powdering the dried material until the individual particles thereof have approximately the same size as the maximum size of the wet milled particles, forming a slip of the powder with water and casting the slip into a porous mold.

FRED A. BICKFORD.